Patented June 10, 1941

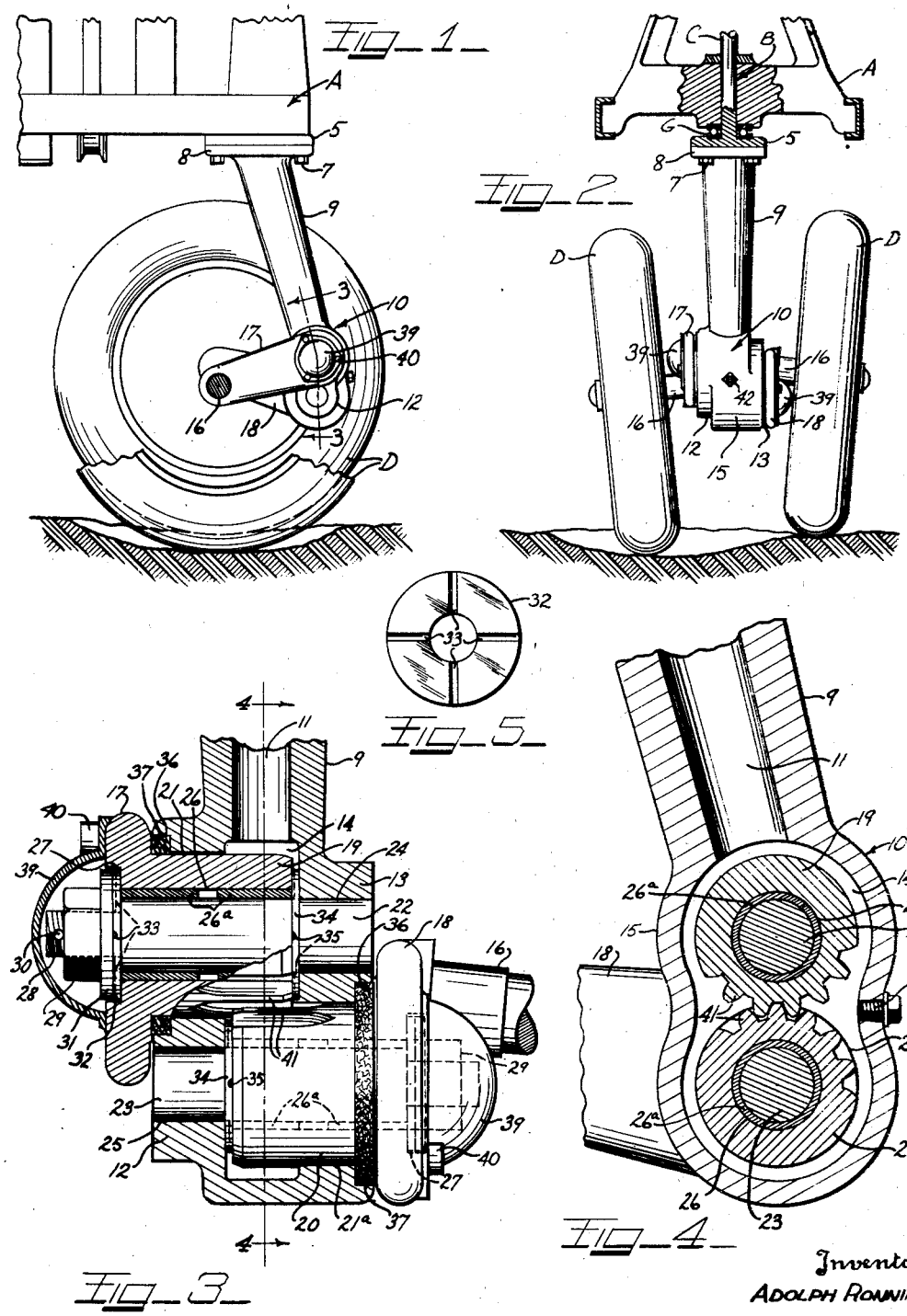

2,244,853

UNITED STATES PATENT OFFICE 2,244,853

STEERABLE VEHICLE TRUCK

Adolph Ronning, Minneapolis, Minn.

Application December 9, 1940, Serial No. 369,238

8 Claims. (Cl. 280—87)

This invention relates to improvements in steerable supporting units or trucks for wheeled vehicles particularly of the automotive type such as tractors and the like.

The invention further relates particularly to improvements in differentially compensating wheeled steering trucks of the type disclosed in my prior Patents Numbers 2,217,816 and 2,217,817, issued to me October 15, 1940, and functionally the present invention is quite similar to the structures disclosed in these patents and others enumerated therein.

The primary object of the present invention is to provide improvements in constructional details of such devices to the end that they may be inexpensively and effectively manufactured and assembled. A further object is to provide various improvements in supporting means for the wheel supported crank members, improvements in the gear connections therebetween and proper sealing against the effects of dust and other foreign matter. Still another object is to provide an improved unitary or one piece supporting member and housing for connecting the truck to the vehicle and rockably supporting the wheel crank members.

These and other more detailed and specific objects will be disclosed in the course of the following specification, reference being had to the accompanying drawing, in which—

Fig. 1 is a side elevation of lower forward portion of a tractor with my invention applied thereto for mounting the steerable front wheels, said wheels being shown as running over uneven ground, and the near wheel being in greatest part broken away to better disclose the structure.

Fig. 2 is a front end elevation of the structure shown in Fig. 1, a part of the tractor being shown in section.

Fig. 3 is an enlarged vertical cross section along the lone 3—3 in Fig. 1, showing only a lower part of the mounting constituting my invention and with parts thereof broken away.

Fig. 4 is a longitudinal vertical section along the line 4—4 in Fig. 3.

Fig. 5 is a detail of one of the oil grooved washers used in the structure.

Referring now more particularly and by reference characters to the drawing, A represents the frame of the vehicle, which is here indicated as being a tractor of a conventional row crop type, and which frame has a vertically axised bearing B rotatably or oscillatably supporting an upright steering post C. The tractor of course has the usual widely spaced rear traction wheels (not shown) and the post C is oscillated about its upright axis for steering purposes by the usual mechanism including a steering wheel (also not shown).

The front ground wheels D are closely spaced in accordance with the usual construction of row crop tractors and are connected to the steering post C in such manner as to be angled thereby for steering the tractor.

The steering post C has a flange 5 at its lower end which is braced upwardly against an antifriction thrust bearing 6 and to this flange is removably secured by screws 7 the upper flanged end 8 of a steerable mounting member 9 forming a part of my invention. Said member 9 angles downwardly and forwardly from its upper end connection to the steering post and at its lower end is enlarged to form an integral housing 10 located approximately in the horizontal plane of the axes of the ground wheels D. The member 9 is made hollow or generally tubular in form, as represented at 11, for lightness and strength, and the housing 10 includes parallel, transversely spaced side walls 12—13 of substantial thickness defining therebetween a recess 14 which is elongated vertically and is of relatively narrow width transversely as shown. Viewed from the side (Fig. 4) the recess 14 is of roughly oblong shape defined by curvilinear walls 15 which form the rounded upper and lower ends of the recess. All of these walls 12, 13, and 15 are as shown formed integrally with the mounting member 9 and this entire unit may be thus cast in one piece. The present construction therefore is much simpler, less expensive to manufacture, and more durable in service than the two piece structures shown in my prior patents hereinbefore identified and which show separable housing assemblies requiring screws to hold the housing sections together.

The wheels D are mounted upon spindles 16 extending rigidly and outwardly (transversely) from the rear ends of crank members or arms 17 and 18 which are disposed on opposite sides of the housing and at forward ends are journaled on transverse axes in the housing whereby said arms may swing in vertical planes with respect to the housing. In the present instance the forward ends of the crank arms 17 and 18 are rotatably or oscillatably mounted in the housing about axes which are vertically spaced relative to each other and thus the construction is similar to that shown in my Patent No. 2,217,816, but the same principles of construction and mounting as herein disclosed may be applied as well to a structure in which the crank arm journals are spaced horizontally one in front of the other as disclosed in my Patent No. 2,217,817.

To thus mount the crank arms 17 and 18 I provide the following construction. The forward ends of the crank arms are provided with integrally formed and inwardly turned tubular extensions 19 and 20 which act both as trunnions for swingably supporting the arms and also as gears for differentially connecting and operating the arms as will appear. These extensions 19 and 20 are mounted loosely through openings 21 and 21a in the side walls 12 and 13, respectively of housing 10, and they are of such length that they will just clear the opposite side walls when the crank arms are brought up alongside or adjacent outer sides of the housing as best seen in Fig. 3. Forming the sole supports and bearings for the crank arms I provide the pins 22 and 23 which are pressed, keyed, or otherwise rigidly mounted, in relatively small openings 24—25 formed in the respective side walls 13 and 12 and which extend therefrom outwardly, concentrically through the aligned, larger openings 21 and 21a in the opposite side walls. These pins thus may enter the bores 26 of the tubular extensions 19 and 20 of the crank arms and rotatably support the same, there being suitable anti-friction bearing bushings 26a placed in the bores to contact the pins and take the wear. Said bores 26 open outwardly through outer sides of the crank arms into diametrically enlarged recesses 27 in said outer sides, and for holding the crank arms against lateral displacement and disengagement from the housing, the outer ends of the pins 22 and 23 are reduced and threaded as at 28 to receive nuts 29 which may be locked by keys 30. Interposed between the nuts 29 and the outer faces of the crank arms are, first, the outer plain washers 31 and then the inner washers 32 which have radially extending oil grooves 33 in their outer surfaces. Also between inner ends of the tubular extensions 19 and 20 and the adjacent inner faces of side walls 13 and 12, respectively, washers 34 are placed, and these washers also have similar oil grooves 35.

The outer edges of the large openings 21 and 21a are grooved out to form diametrically enlarged seats 36 in which are placed felt sealing and oil retaining rings 37. These rings are compressed slightly between their seats and the inner faces of the crank arms and serve to retain oil within the housing as well as to exclude dust and other foreign matter.

As stated, the tubular extensions of the crank arms have no bearing except upon the pins 22 and 23 and the outer peripheral surfaces of these tubular members thus clear the inner surfaces of the openings 21 and 22 as clearly designated in Fig. 3. Further to reduce friction the washers 31 and 32 clear the annular margins of the recesses 27 and only serve to take the small amount of end thrust present.

Dust caps 39 are secured by screws 40 over the outer sides of the crank arms to enclose and conceal the nuts and washers.

The inner end portions of the tubular extensions or trunnion members 19 and 20 are formed with gear teeth as designated at 41 which are milled in their outer surfaces and the spacing (vertically) between the axes of these members as they are mounted is less than the sum of the two radii so that, as they are entered into the housing, these teeth will be placed in mesh as clearly seen in Fig. 4. The gear teeth are of course formed on adjacent surfaces of the tubular members for this purpose, and need not be continued entirely around the peripheries thereof since only limited relative oscillating movements are required.

In operation, the weight of the tractor, as imposed upon the member 9 and housing 10, will be transmitted through the pins 22 and 23, the gear or toothed connection of the tubular extensions 19 and 20, through the crank arms 17 and 18 to the wheels D. All of these parts will remain relatively stationary when the wheels D travel over a smooth surface, but when an irregular surface is encountered, as shown in Figs. 1 and 2, then the gear toothed connection of the crank arms will function to permit the wheels to assume relative vertical position in order to compensate for such irregularities. The action is of course differential and the wheels will thus maintain equal ground contact and the load will at all times be evenly distributed to the wheels.

A removable plug 42 is placed in the forward wall 15 of the housing 10 to permit the oiling of parts within the housing.

The spindles 16 slope slightly in the outward direction to impart the desired camber to the wheels D.

The forward and downward inclination or slope of the member 9 of course is for the purpose of supporting the housing 10 forwardly to the point that the rearwardly extending crank arms 17 and 18 will dispose the wheels D roughly in the transverse vertical plane of the steering axis. Steering resistance of the wheels is thus reduced to a minimum.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A vehicle supporting truck comprising a mounting member, a pair of wheel supported crank arms mounted one at each side of the mounting member, transversely axised pins rigidly mounted on said member, tubular extensions on said arms journaled on the pins for oscillating movements thereabout in relative up and down directions, and meshing gear means on said trunnion members differentially connecting the cranks and causing them to oscillate in opposite directions.

2. A vehicle supportion truck comprising a mounting member, a pair of pins rigidly mounted on transverse axes in said member, a pair of wheel supported crank arms disposed at opposite sides of the member and pivotally mounted on said pins for relative upward and downward oscillating movements at their wheel supported ends, gear means integral with each of the arms and placed in meshing relation to thereby differentially connect the arms and cause them to oscillate in opposite upward and downward directions.

3. A vehicle supporting truck comprising a member depended from the vehicle and having a housing at its lower end portion, a pair of wheel supported crank arms disposed at opposite sides of the housing and having inwardly turned pivot members at their ends, the sides of the housing having openings adapted to receive said pivot members, means pivotally engaging the said pivot members and thereby supporting the arms for relative upward and downward movements, and gear means on the pivot members, movable therewith through said openings into intermeshing positions in the housing to thereby differentially connect the crank arms and cause them to oscillate in opposite directions.

4. A vehicle supporting truck comprising a mounting member, a housing of one piece construction formed integrally with the mounting member, the said housing having openings in opposite side walls, pins rigidly mounted in the housing and extending on transverse axes concentrically with respect to said openings, a pair of wheel supported crank arms pivotally mounted on the pins for oscillating movements thereabout in generally vertical planes, tubular trunnion members on the crank arms journaled on the said pins and extending loosely through said openings into said housing, and differentially operating means connecting said trunnion members causing the crank arms to oscillate in opposite directions in their respective vertical planes.

5. A vehicle supporting truck comprising a housing having openings in opposite sides and spaced apart on different transverse axes, pins mounted rigidly in the housing and extending concentrically outward through the openings on transverse axes, a pair of wheel supported crank arms having integral inwardly turned tubular pivot members journaled on the said pins and extending loosely through said openings into the housing, means on said pivot members within the housing for differentially connecting the arms and for causing opposite up and down movements of the arms at their wheel supported ends, and removable means on outer ends of the pins engaging the crank arms to retain them on the pins.

6. A vehicle supporting truck comprising a housing having openings in opposite sides and spaced apart on different transverse axes, pins mounted rigidly in the housing and extending concentrically outward through the openings on transverse axes, a pair of wheel supported crank arms having integral inwardly turned tubular pivot members journaled on the said pins and extending loosely through said openings into the housing in relative endwise overlapping positions, and meshing gear teeth on the said pivot members differentially connecting the arms for opposite upward and downward oscillating movements about the axes of the said pins.

7. A vehicle supporting truck comprising a housing having openings in opposite sides and spaced apart on different transverse axes, pins mounted rigidly in the housing and extending concentrically outward through the openings on transverses axes, a pair of wheel supported crank arms having integral inwardly turned tubular pivot members journaled on the said pins and extending loosely through said openings into the housing, means on said pivot members within the housing for differentially connecting the arms and for causing opposite up and down movements of the arms at their wheel supported ends, the bores of said tubular pivot members extending outwardly through the sides of the crank arms, washers disposed on the pins at inner ends of the tubular members and at outer sides of the crank arms, and nuts threaded on outer ends of the pins to urge said washers into engagement with the crank arms and pivot members and prevent axial displacement of the crank arms along the pins.

8. A vehicle supporting device comprising a mounting member having cylindrical recesses in opposite sides thereof axially offset with respect to each other, a pair of wheel supported arms, swingably secured one at each side of the mounting member, and each having a pivot member movable endwise into one of the recesses, into overlapping position with the inner end portion of the corresponding pivot member of the other supporting arm, the inner end portions of said pivot members being provided with intermeshing gears the diameters of which are less than the diameters of said recesses whereby the gears may be moved endwise with their respective pivot members into said recesses.

ADOLPH RONNING.